(12) United States Patent
Chen et al.

(10) Patent No.: US 6,324,308 B1
(45) Date of Patent: Nov. 27, 2001

(54) NON-UNIFORMITY CORRECTION METHOD AND APPARATUS FOR IMAGING SYSTEMS

(75) Inventors: Peiyi Chen; Ruizhong Wang; Peixin Qian, all of Beijing (CN)

(73) Assignee: Winbond Electronics (H.K.) Ltd (HK)

( * ) Notice: Subject to any disclaimer, the term of this patent is extended or adjusted under 35 U.S.C. 154(b) by 0 days.

(21) Appl. No.: 09/198,875

(22) Filed: Nov. 24, 1998

(51) Int. Cl.$^7$ ............................................. H04N 7/01
(52) U.S. Cl. ................................. 382/275; 382/260
(58) Field of Search ........................... 382/275, 260–269, 382/276–281

(56) References Cited

U.S. PATENT DOCUMENTS

| | | | |
|---|---|---|---|
| 4,611,348 | * | 9/1986 | Williams et al. ................... 382/44 |
| 5,048,105 | * | 9/1991 | Adachi ................................ 382/47 |
| 6,069,661 | * | 5/2000 | Ibenthal ........................... 348/441 |

* cited by examiner

*Primary Examiner*—Thomas D. Lee
*Assistant Examiner*—Stephen Brinich
(74) *Attorney, Agent, or Firm*—Raymond Sun (57) ABSTRACT

An imaging system having an improved correction module is provided. The system has a detector array with a plurality of detectors that are arranged in rows and columns. Each detector generates a non-corrected data value. The system also includes a signal processing module, coupled to the detector array, for receiving the non-corrected data values and for correcting the non-corrected data values for errors that stem from non-uniformity in detector process and bias. The non-uniformity correction module has a first input for receiving the non-corrected data values, a second input for receiving one or more fitting coefficients, and a third input for receiving a correction order. Based on these inputs, the non-uniformity correction module generates a plurality of corrected data values corresponding to the received non-corrected data values.

13 Claims, 7 Drawing Sheets

| j (NO. OF DETECTORS) | | 1 | 2 | 3 | 4 | 5 | 6 |
|---|---|---|---|---|---|---|---|
| 1 ORDER 5 POINT CORRECTION BY THE NEW METHOD | $a_{0j}$ | -42.71 | 260.1 | -190.4 | -3.626 | 212.0 | -187.7 |
| | $a_{1j}$ | -0.1362 | -0.3074 | 0.1676 | -0.01733 | -0.2573 | 0.2114 |
| 1 ORDER 5 POINT CORRECTION BY SCHULZ'S METHOD | $a_{0j}$ | -37.54 | 200.8 | -224.6 | -3.563 | 170.7 | -235.5 |
| | $a_{1j}$ | -0.1199 | -0.2366 | 0.1979 | -0.01704 | -0.2064 | 0.2660 |
| 2 ORDER 5 POINT CORRECTION BY THE NEW METHOD | $a_{0j}$ | -26.57 | 89.24 | -91.89 | -6.366 | 45.33 | -113.0 |
| | $a_{1j}$ | -0.1740 | 0.03732 | -0.03229 | -0.01184 | 0.08138 | 0.06683 |
| | $a_{2j}$ | 1.667e-5 | -0.000145 | 7.104e-5 | -2.119e-6 | -0.000142 | 4.894e-5 |
| 2 ORDER 5 POINT CORRECTION BY SCHULZ'S METHOD | $a_{0j}$ | -22.20 | 113.2 | -58.26 | -6.280 | 74.67 | -100.7 |
| | $a_{1j}$ | -0.1500 | -0.06497 | -0.1282 | -0.01171 | -0.01800 | 0.001765 |
| | $a_{2j}$ | 1.136e-5 | -6.485e-5 | 0.000123 | -2.012e-6 | -7.117e-5 | 9.983e-5 |

FIG.8

NON-UNIFORMITY CORRECTION METHOD AND APPARATUS FOR IMAGING SYSTEMS

FIELD OF THE INVENTION

The present invention relates generally to imaging systems and more specifically to an improved non-uniformity correction method and apparatus for imaging systems.

BACKGROUND OF THE INVENTION

Infrared detection and imaging systems detect the amount of radiation generated by a target. Any target having a temperature greater than 0° K can emit radiation in the form of infrared signals. Accordingly, the infrared detection and imaging systems generate an image of temperatures of the target or a "thermal image" of the target. Infrared detection and imaging systems often employ focal plane arrays or "FPAs" to generate these "thermal images". For example, these infrared detection and imaging systems are widely used in the military for target detection and tracking. The FPA includes a plurality of detectors arranged in rows and columns. Each detector detects infrared signals and converts the infrared signal into a corresponding electrical signal. A detector's responsibility is defined as the relationship between the received infrared signal level and the corresponding electrical signal generated by the detector.

The responsibility of each detector in a FPA is dependent on the process employed to make that detector and also on the bias provided to the detector. Accordingly, across the FPA, differences in the process and bias cause the responsibility of the detectors to vary. This variation of the responsibility of the detectors causes errors, such as fixed pattern noise in the infrared detection and imaging system. Fixed pattern noise is undesirable in imaging systems because the fixed pattern noise causes the degradation of temperature resolution of the imaging systems (i.e., increases the minimum resolvable temperature difference (MRTD) of the imaging systems).

Moreover, the variation of the responsibility of the detectors degrades the temperature resolution of the system resulting in loss of detail, contrast, and quality in the thermal image. Accordingly, the electrical signal generated by the FPA must first be corrected by software or hardware to account for the non-uniformity of process and bias across the FPA.

A first known approach to non-uniformity correction employs a two-point or multi-point linear correction method. One advantage of this approach is that only two correction parameters need to be stored for each detector thereby simplifying the implementation of this approach. This approach provides good results if the response of the detectors varies in a linear fashion with respect to the target temperature (i.e., if the graph of the target temperature versus electrical signal generated by the detector is linear). Unfortunately, the response of the detectors often varies in a non-linear fashion with respect to target temperature. For detectors with a non-linear response, this first approach provides poor results with relatively large error, which may be unacceptable. For more information about this first approach, please see Y. Gao, M. Wu, Q. Shou, Chinese Journal of Infrared and Millimeter Wave 12, 169 (1993).

A second known approach to non-uniformity correction employs a piece-wise linear correction method. The piece-wise linear correction method first divides the responsibility curve (i.e., temperature vs. electrical signal graph) into one or more intervals. Each interval is then approximated by a line. Unfortunately, the piece-wise linear correction method has two disadvantages. First, there are many more correction parameters that need to be stored as compared to the first method. For example, if the number of intervals is n, then for each detector, 2n number of parameters need to be stored. Second, the temperature interval to which the response signal of the detector belongs needs to be decided so that the right correction parameters can be selected.

A third known approach, also known as Schulz's approach, to non-uniformity correction employs a polynomial fitting method. This method is suited for FPA detectors having non-linear photo-response characteristics. The basic principle of Schulz's approach is to fit $\Delta Y_j$ (i.e., the difference between a detected signal of each detector and a mean response signal $<Y>$ of all N detectors to a same target) by an n-th order polynomial of $<Y>$.

Schulz's primary expression is as follows:

$$\Delta Y_j = Y_j - \langle Y \rangle \approx \sum_{i=0}^{n} a_{ij} \langle Y \rangle^i,$$

where (j=1, 2, ... N).

The fitting coefficients $a_{ij}$ can be obtained from measured data of the detectors at several points in a range of target temperatures. We can solve the above expression for $<Y>$ and get $$<Y> \approx F_j(Y_j), \text{ where } (j=1, 2, \ldots N).$$

Since the value of $Y_j$ after correction should be $<Y>$, the correction expression of $Y_j$ is $$Y_j^c = F_j(Y_j), \text{ where } (j=1, 2, \ldots N).$$

For a correction order of n=0, the correction expression is as follows:

$$Y_j^c = Y_j - a_{0j}, \text{ where } (j=1, 2, \ldots N).$$

For a correction order of n=1, the correction expression is as follows:

$$Y_j^c = \frac{Y_j - a_{0j}}{1 + a_{1j}},$$

where (j=1, 2, ... N.

For a correction order of n=2, the correction expression is as follows:

$$Y_j^c = -\frac{1 + a_{1j}}{2a_{2j}} \pm \sqrt{\frac{(1 + a_{1j})^2}{4a_{2j}^2} + \frac{Y_j - a_{0j}}{a_{2j}}},$$

where (j=1, 2, ... N). For more information about this third approach, please see M. Schulz and L. Caldwell, Infrared Physics & Technology 36, 763 (1995).

This third method overcomes the disadvantages of the piece-wise linear approach. However, this third method has the following disadvantages: (1) it requires division and root extraction operations, such as square root operations; (2) it generates non-analytic correction expressions when the correction order (n) is greater than or equal to three; (3) it involves having to select correct roots from multiple roots expressions when the correction order (n) is greater than one; and (4) the correction expression, even for n=2, is complex to implement. These complexities are further compounded when the correction order is increased above two.

Based on the foregoing, there remains a need for an improved method and apparatus for correction of non-uniformity in focal plane arrays that overcomes the disadvantages discussed previously.

SUMMARY OF THE INVENTION

It is an object of the present invention to provide a correction module for imaging systems that reduces errors that stem from differences in bias and process across a detector array.

It is a further object of the present invention to provide a correction module for imaging systems that reduces fixed pattern noise in the system.

It is another object of the present invention to provide a correction module for imaging systems that does not require division operations.

It is a further object of the present invention to provide a correction module for imaging systems that does not require extraction of roots.

It is yet another object of the present invention to provide a correction module for imaging systems that is easier to implement in either hardware or software than conventional polynomial fitting methods.

In order to accomplish the objects of the present invention, an imaging system having an improved correction module is provided. The imaging system has a detector array with a plurality of detectors that are arranged in rows and columns. Each detector generates a non-corrected data value. A signal processing module is coupled to the detector array to receive the non-corrected data values and corrects the non-corrected data values for errors that stem from non-uniformity (i.e., differences) in the process and bias of the detectors in the array. The non-uniformity correction module has a first input for receiving the non-corrected data values, a second input for receiving fitting coefficients, and a third input for receiving a correction order. Based on these inputs, the non-uniformity correction module generates a plurality of corrected data values corresponding to the received non-corrected data values.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

An improved non-uniformity correction module is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

IMAGING SYSTEM 12

Figure 1:
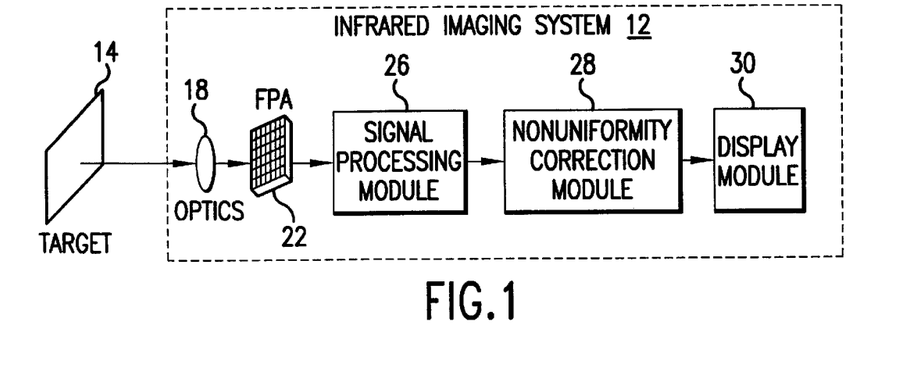
FIG. 1 illustrates an imaging system in which the present invention can be implemented.

FIG. 1 illustrates an infrared imaging system 12 in which the non-uniformity correction module of the present invention can be implemented. The infrared imaging system 12 is employed to detect a target 14 that emits infrared radiation. The target 14 can be any object that is at a temperature greater than 0° K. According to Planck's law, any object at a temperature greater than 0° K can give off infrared radiation.

The infrared imaging system 12 can be used for military, civil, and scientific research applications. For example, the infrared imaging system 12 can be implemented in military applications, such as night vision, infrared guidance, infrared search and tracing, and early warning systems. Also, the infrared imaging system 12 can be implemented in civil applications, such as medical diagnosis and remote sensing and measurement.

The infrared imaging system 12 includes optics 18, a detector array 22, such as a focal plane array (FPA), coupled to the optics 18, a signal processing module 26, coupled to the detector array 22, a non-uniformity correction module 28 of the present invention, and a display 30, coupled to the non-uniformity correction module 28, for displaying a detected image.

Optics 18 are well known by those of ordinary skill in the art and can be an optics system that includes a chopper, filter, etc, or a single lens. Optics 18 is for collecting the radiation from a target to the surface of the FPA. Preferably, the lens is made from a germanium material. Display 30 can be a television monitor, personal computer (PC) monitor, or other custom monitor designed for a particular application.

The detector array 22 is provided for (1) converting received radiation of the target 14 in the form of infrared signals into corresponding electrical signals that are not corrected (hereinafter referred to as non-corrected data values), and (2) providing these non-corrected data values in a predetermined order to the signal processing module 26. The predetermined order can be a row-by-row order or a column-by-column order although a row-by-row order is preferred. The signal processing module 26 receives the non-corrected data values from the detector array 22 and performs signal processing on the non-corrected data values.

Figure 2A:
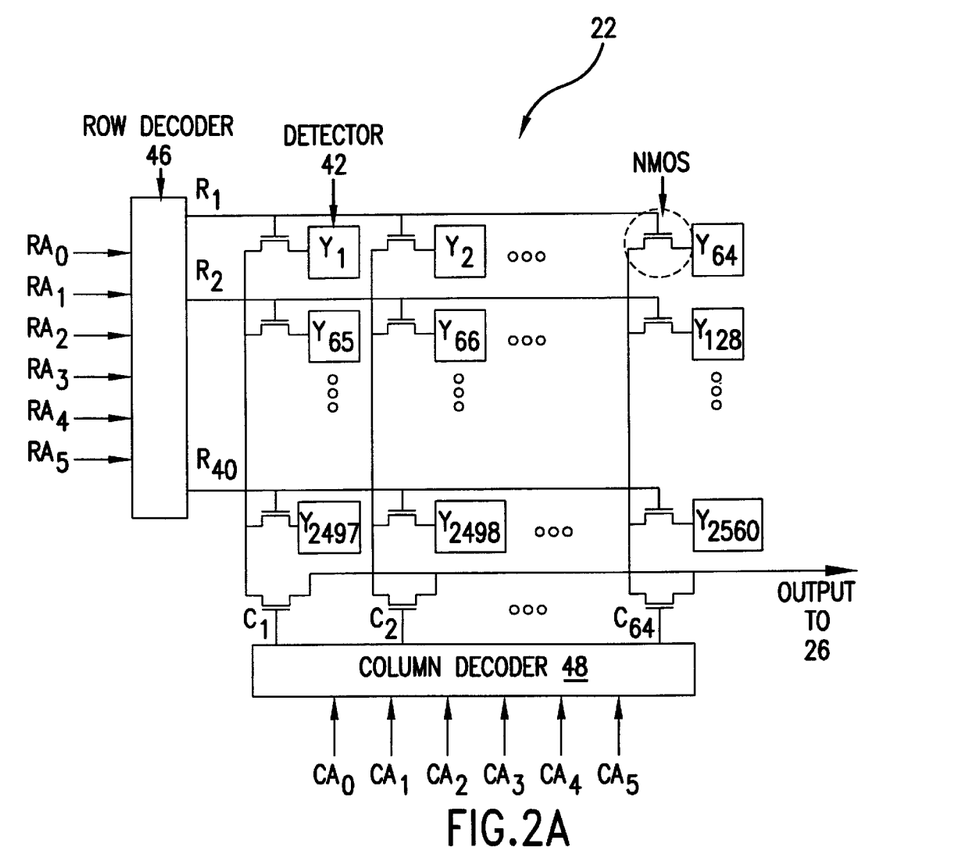
FIG. 2A illustrates in greater detail the detector array of FIG. 1.

FIG. 2A illustrates in greater detail the detector array 22 of FIG. 1. The detector array 22 includes N detectors 42 that are arranged in A rows and B columns. Accordingly, N is equal to A times B. FIG. 2A illustrates an exemplary array having 40 rows and 64 columns for a total of 2560 detectors. A conventional detector array 22 has a size that ranges from a 10 by 10 array to a 1000 by 1000 array depending on the needs of a particular application. Generally, the larger the scale of the array, the space resolution of the imaging system increases, as well as the cost to implement such a system. Each detector 42 is a sensor that can respond to the infrared radiation of a target 14. Each detector 42 receives the infrared radiation from the target 14 and converts the radiation into a corresponding electrical signal according to methods and techniques that are known by those of ordinary skill in the art (i.e., the non-corrected data value), denoted by $Y_j$, where j ranges from 1 to N.

The detector array 22 also includes a row decoder 46 for receiving input row address signals (RA_0 ... RA_5) and based thereon for generating row-selecting signals (RA_1 ... RA_40). The detector array 22 also includes a column decoder 48 for receiving input column address signals (CA_0 ... CA_5) and based thereon for generating column-selecting signals (R_1 ... R_64). Row and column decoders 46, 48 are utilized to read out the non-corrected data values and provide these values to the signal processing module 26. The detector array 22 can be made of a charge coupled device (CCD), a charge sweep device (CSD) or a complementary metal oxide semiconductor (CMOS). In a monolithic detector array, the detectors 42 are integrated with the row and column decoders 46, 48 on a single integrated circuit. In a hybrid detector array, the detectors 42 are coupled to column and row decoders 46, 48 through bonding wires.

Figure 2B:
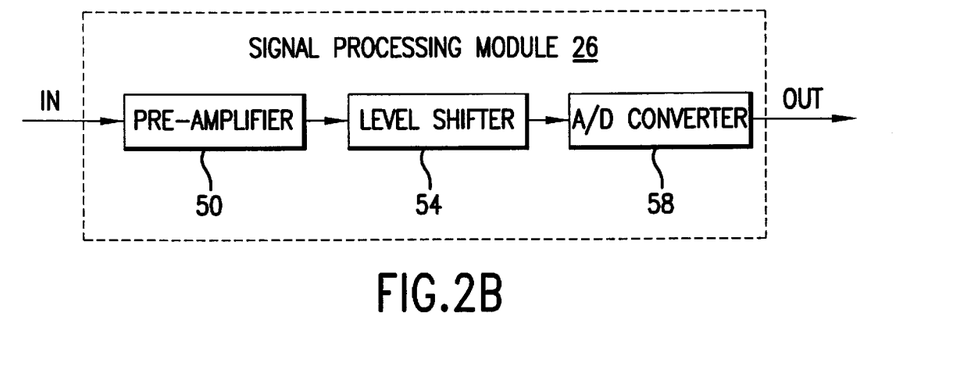
FIG. 2B illustrates in greater detail the functional blocks of the signal processing module of FIG. 1.

FIG. 2B illustrates in greater detail the functional blocks of the signal processing module 26 of FIG. 1. The signal processing module 26 includes the following primary functional blocks: a pre-amplifier 50, a level shifter 54 coupled to pre-amplifier 50, and an analog-to-digital (AND) converter 58 coupled to level shifter 54. Pre-amplifier 50 is coupled to receive signals (IN) from detector array 22 and provides pre-amplification of the received signals. Level shifter 54 is coupled to receive the pre-amplified signals from pre-amplifier 50 and shifts the pre-amplified signals to proper voltage levels in preparation for conversion into digital signals. Analog-to-digital (A/D) converter 58 is coupled to receive the level-shifted signals from level shifter 54 and converts the received analog signal into a corresponding signal (OUT) in digital form. The implementation of pre-amplifier 50, level shifter 54, and analog-to-digital (A/D) converter 58 is generally known to those of ordinary skill in the art and will not be described in greater detail herein.

NON-UNIFORMITY CORRECTION MODULE 28

Figure 3:
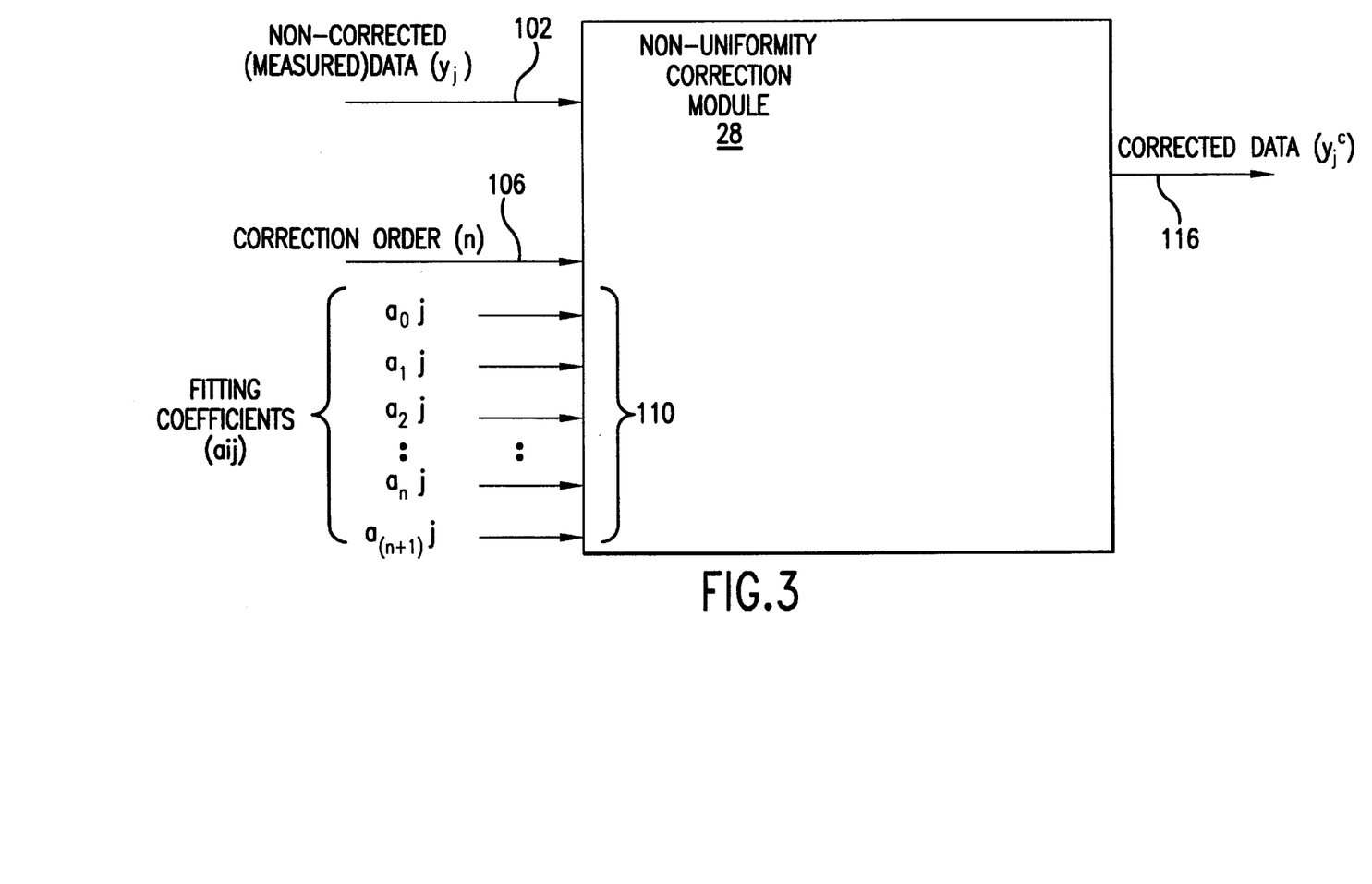
FIG. 3 illustrates a block diagram of a non-uniformity correction module of the present invention.

FIG. 3 illustrates a block diagram of the non-uniformity correction module 28 of the present invention. The non-uniformity correction module 28 can be implemented in the signal processing module 26 or as a separate module as shown in FIG. 3. The non-uniformity correction module 28 includes a first input 102 for receiving the non-corrected data or measured data ($Y_j$) from analog-to-digital (A/D) converter 58. The index j designates that the data is from a particular detector 42 in the array. This non-corrected data or measured data ($Y_j$), as explained in the Background section, often contains errors due to non-uniformities in process and bias across the array 40. The non-uniformity correction module 28 is provided to reduce these errors. The non-uniformity correction module 28 also includes a second input 106 for receiving a correction order (n) 106, and a third input 110 for receiving fitting coefficients ($a_{ij}$) 110, where "i" is the index for specifying the correction order. If the correction order is n, then there are n+1 fitting coefficients (i.e., $a_{0j}, a_{1j}, \ldots, a_{nj}, a_{(n+1)j}$) for each detector 42. The fitting coefficients 110 are obtained from measured data values of the detectors 42 at several points in the range of target temperatures.

Based on the non-corrected data or measured data ($Y_j$), the correction order (n), and the receiving fitting coefficients ($a_{ij}$) 110, the non-uniformity correction module 28 of the present invention generates corrected data ($Y_j^c$) in accordance with the following relationships:

$$\Delta Y_j = Y_j - \langle Y \rangle \approx \sum_{i=0}^{n} a_{ij} Y_j^i,$$

where (j=1, 2, ... N). (1)

$$\langle Y \rangle \approx Y_j - \sum_{i=0}^{n} a_{ij} Y_j^i,$$

where (j=1, 2, ... N). (2)

$$Y_j^c = Y_j - \sum_{i=0}^{n} a_{ij} Y_j^i,$$

where (j=1, 2, ... N). (3)

It will be noted that the approach of the present invention does not involve any division operations or any root extraction operation, such as a square root operation. In addition, since $\Delta Y_j$ is fitted with the polynomial of $Y_j$ and not $\langle Y \rangle$, regardless of the correction order (n), the correction relationship (3) is an analytic expression. Moreover, since no extraction of roots is needed, selection of correct roots of an equation having multiple roots is not needed.

Figure 8:
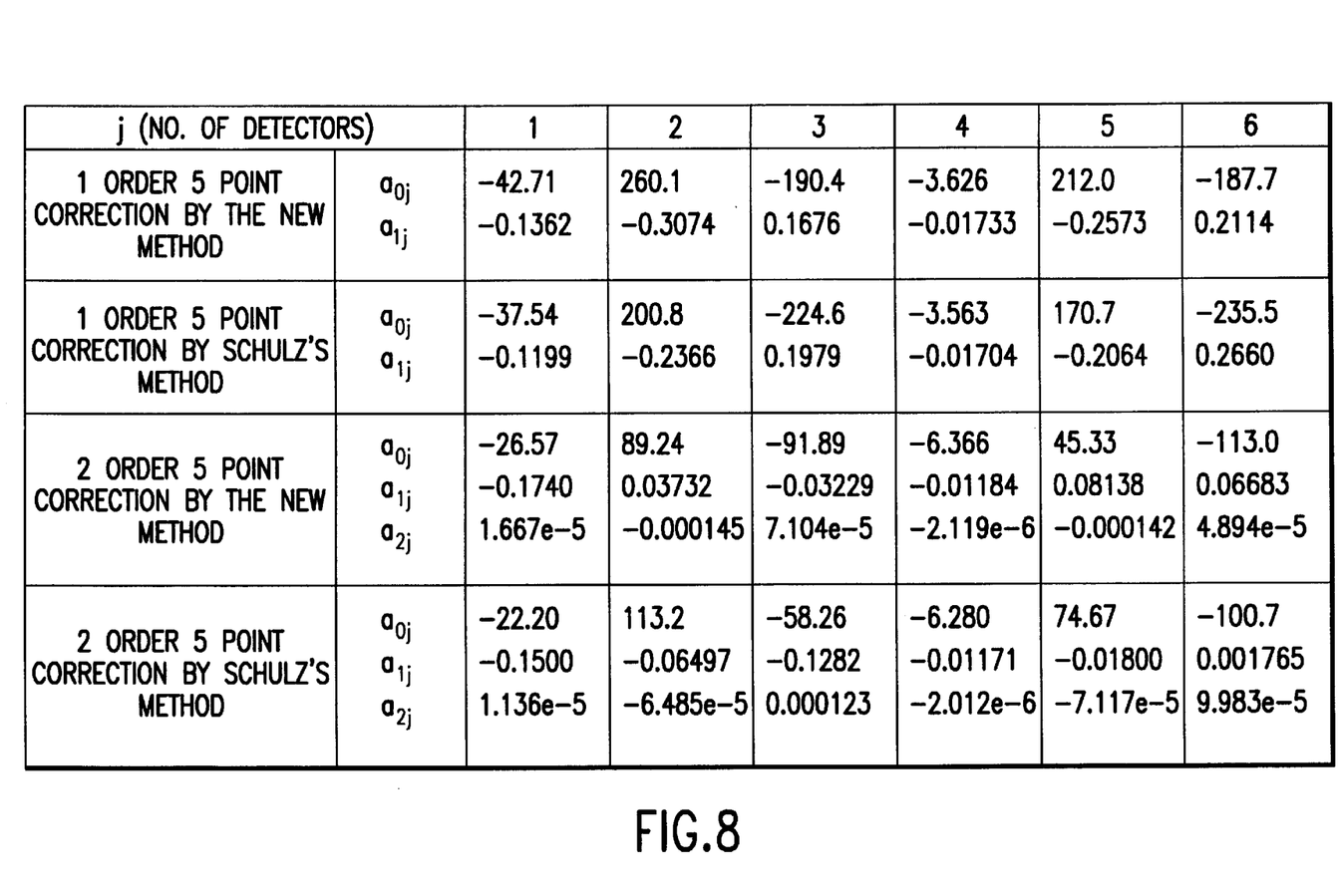
FIG. 8 is a table that illustrates the fitting coefficients for the Schulz's approach and the present invention where j, the number of detectors ranges, from 1 to 6.

FIG. 8 is a table that illustrates the fitting coefficients for the Schulz's approach and the present invention where j, the number of detectors, ranges from 1 to 6.

OPERATION

The operation of the system 12 of FIG. 1, and in particular, the non-uniformity correction module 28 of the present invention, will now be described. First, non-corrected data values ($Y_j$) are received by non-uniformity correction module 28 from signal processing module 26. Next, a correction order (n) is received by non-uniformity correction module 28 from a user. Alternatively, non-uniformity correction module 28 can be configured to have a predetermined correction order. Previously determined correction parameters ($a_{ij}$) (also referred to herein as fitting coefficients) are then received or read from memory or other storage file (not shown). The correction parameters ($a_{ij}$) depend on the particular FPA 22 employed and can be derived empirically through experiments with the particular FPA 22, through modeling, or otherwise. Once determined, the correction parameters ($a_{ij}$) can be stored in a memory or other storage file for future use (i.e., when imaging system 12 is in operation). Finally, the corrected data values ($Y_j^c$) are generated by non-uniformity correction module 28 in accordance to correction expression (3), noted above.

It is noted that expression (3) can be evaluated to derive different relationships that correspond to a desired correction order (3). For example, a different relationship can be derived from expression (3) for order n=2, 3, 4, 5, 6, etc. Since expression (3) of by the present invention does require a square root operation, the implementation of the present invention is simpler than known art. In fact, the present invention can be implemented with multiplier and adder circuits without the need for square root circuits, absolute function circuits and comparator circuits that are all needed by known art for root determination and verification. Even for higher correction orders (i.e., for n>1), the present invention can be implemented by multiplier and adder circuits. The following examples illustrate the differences between how the known art is implemented and the present invention is implemented for n=2, as well as the circuit simplifications made possible by the present invention.

Figure 4:
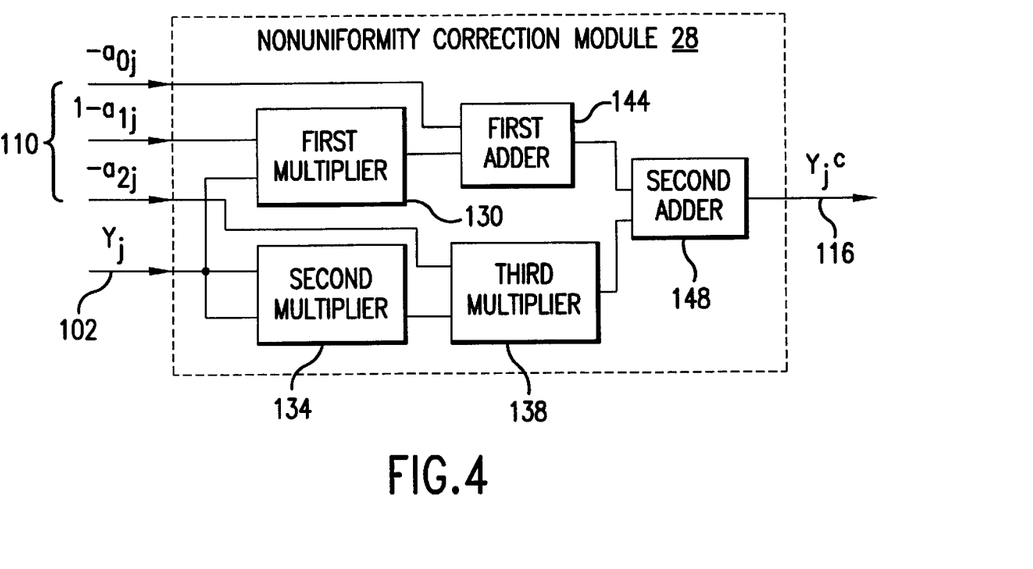
FIG. 4 is a block diagram of a non-uniformity correction module of the present invention for correction order n=2.
Figure 5:
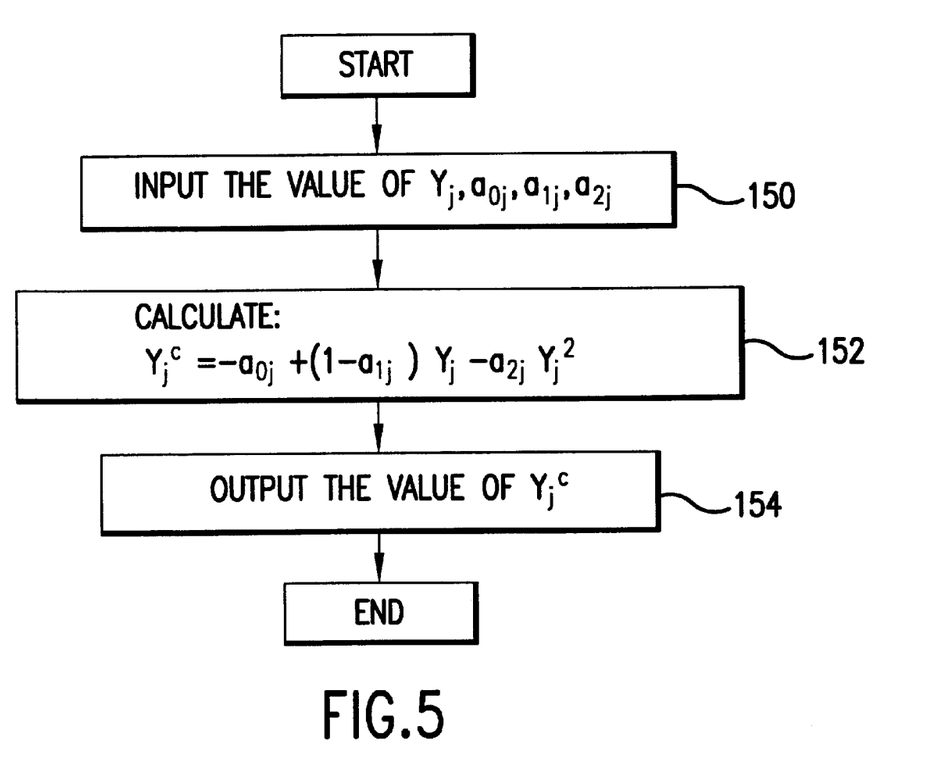
FIG. 5 is a flowchart illustrating the processing steps performed by the correction module of FIG. 4.

Referring to FIGS. 4 and 5, one implementation of the present invention for correction order n=2 is now described. When n=2, the expression (3) for ($Y_j^c$) becomes $$Y_j^c = -a_{0j} + (1-a_{1j})Y_j - a_{2j}Y_j^2$$

which is set forth in step 152 of FIG. 5. Accordingly, for correction order (n=2), non-uniformity correction module 28 can include a first multiplier 130, a second multiplier 134, a third multiplier 138, a first adder 144, and a second adder 148. First multiplier 130 includes a first input for receiving a first correction parameter ($1-a_{1j}$), a second input for receiving the uncorrected input signal ($Y_j$), and an output for providing a first product (i.e., a product of the input signals). Second multiplier 134 includes a first input and second input both for receiving the uncorrected input signal ($Y_j$), and an output for providing a second product (i.e., a product of the input signals). Third multiplier 130 includes a first input for receiving a second correction parameter ($-a_{2j}$), a second input for receiving the output of second multiplier 134, and an output for providing a third product (i.e., a product of the input signals). First adder 144 includes a first input for receiving a third correction parameter ($-a_{0j}$), a second input for receiving the output of first multiplier 130, and an output for providing a first sum (i.e., the sum of the input signals). Second adder 148 includes a first input for receiving the output of first adder 144, a second input for receiving the output of third multiplier 138, and an output for providing a second sum (i.e., the sum of the input signals). The second sum is the corrected data signal ($Y_j^c$) Accordingly, the second adder 148 provides the corrected data signal ($Y_j^c$).

Referring to FIG. 5, the processing steps carried out by the circuit of FIG. 4 are described. In processing step 150, input signals (e.g., $Y_j$, n, $a_{0j}$, $a_{1j}$, $a_{2j}$) are received. In processing step 152, $Y_j^c$ is determined by using the expression, $Y_j^c = -a_{0j} + (1-a_{1j})Y_j - a_{2j}Y_j^2$. In processing step 154, the value of $Y_j^c$ is provided.

CONTRAST WITH SCHULZ'S APPROACH

Figure 6:
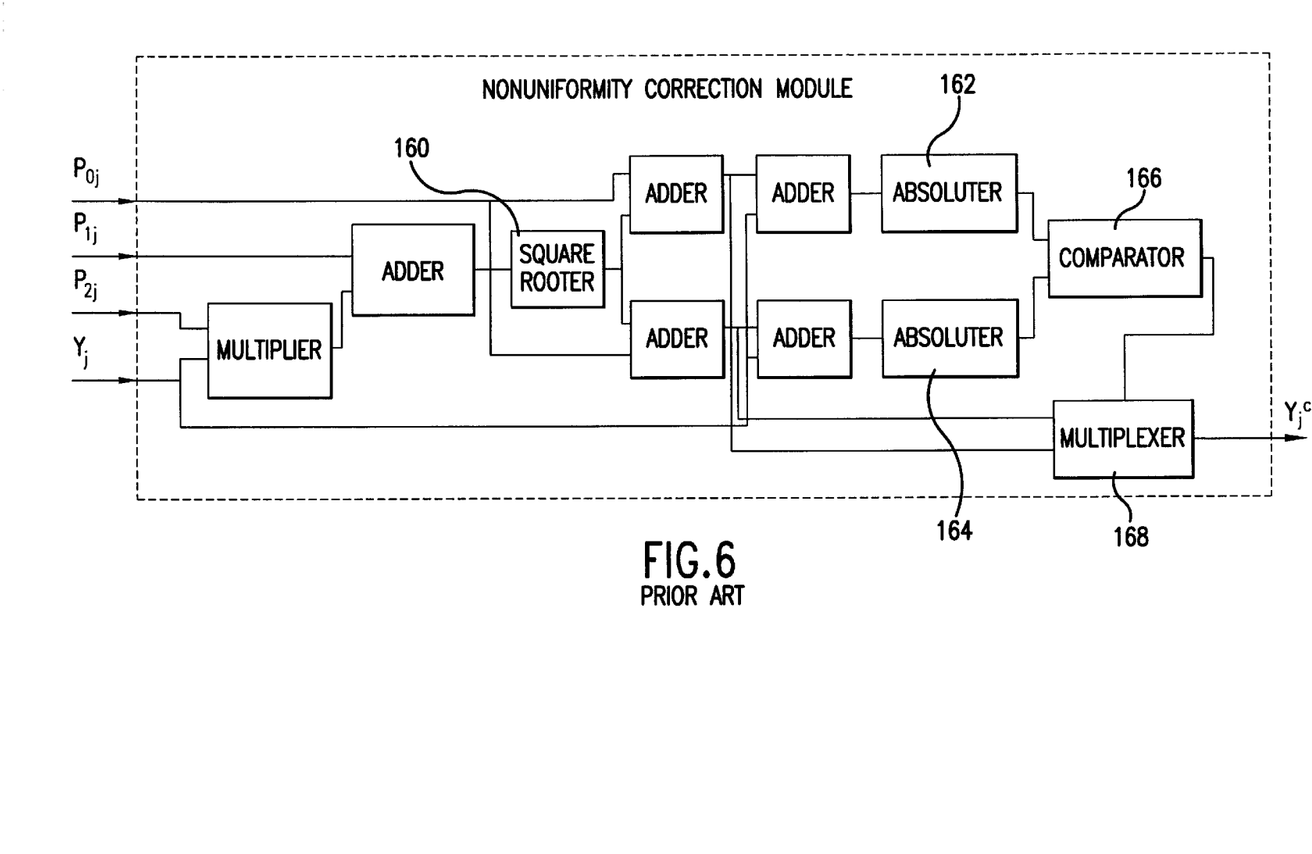
FIG. 6 is a block diagram of a prior art Schulz correction module for correction order n=2.
Figure 7:
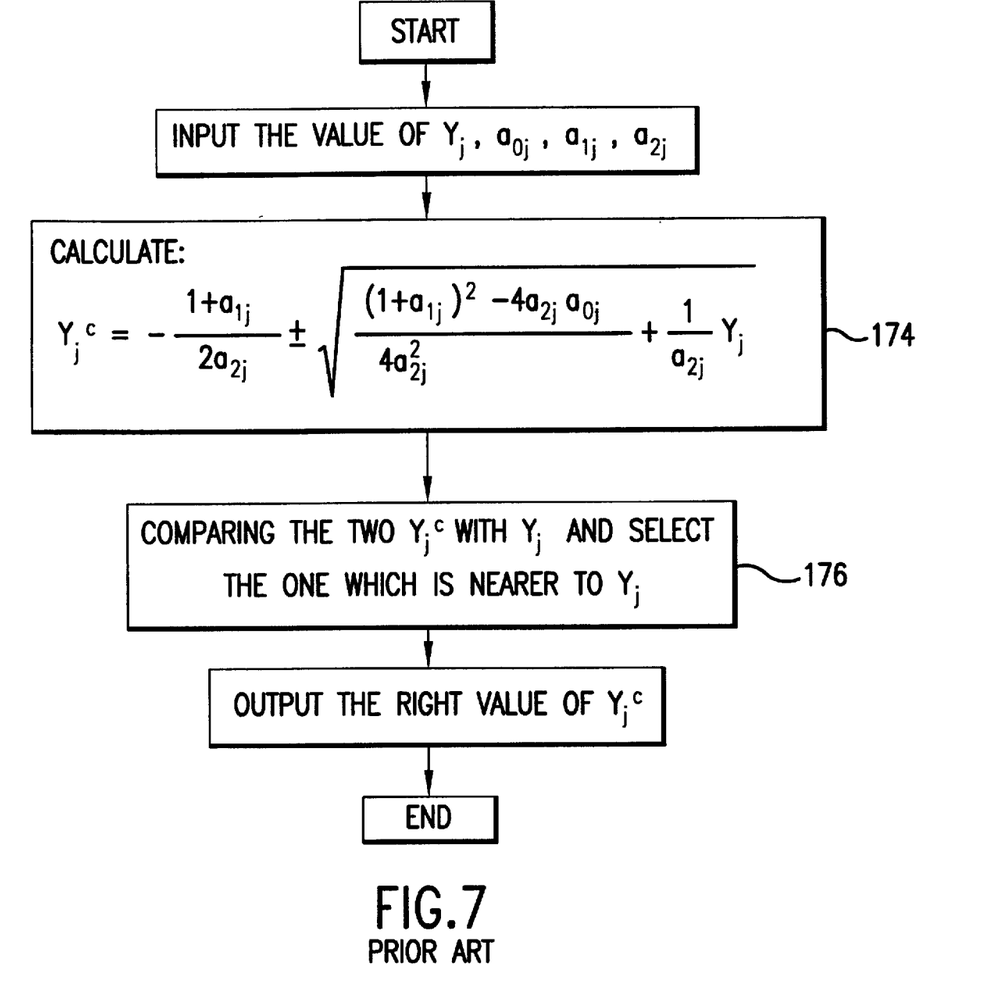
FIG. 7 is a flowchart illustrating the processing steps performed by the correction module of FIG. 6.

Referring to FIGS. 6 and 7, one implementation of the Schulz's approach for correction order n=2 is described. In contrast to the present invention, in the Schulz's approach, $\Delta Y_j$ is fitted by the polynomial of <Y>. This fitting requires complex circuits such as square root circuit 160, absolute value circuits 162, 164, a comparator 166, and a multiplexer 168 that are not needed by the present invention. As illustrated in FIG. 7, the Schulz approach evaluates a much more complex expression in step 174 as compared to the expression in step 152 of FIG. 5. Moreover, an additional step (176) is needed to compare the two $Y_j^c$ values with $Y_j$ and to select the one that is nearer to $Y_j$.

The present invention can be implemented by software that executes on a process or by hardware, such as by an application specific integrated circuit (ASIC). When implemented by software, the fitting coefficients are stored in a file or memory, and the non-uniformity correction module 28 is implemented by a computer program. When implemented by hardware, the fitting coefficients are stored in a memory, and the non-uniformity correction module 28 is implemented by an ASIC, which is faster than the software implementation.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An imaging system, comprising:

a detector array having a plurality (N) of infrared detectors, arranged in rows and columns, each detector generating a non-corrected data value ($Y_j$), with each detector receiving an infrared signal and responsive thereto generates an electrical signal representative of the infrared signal;

a non-uniformity correction module, coupled to the detector array, for receiving the non-corrected data values for each detector and for correcting errors in the non-corrected data values, said non-uniformity correction module having a first input for receiving the non-corrected data values, a second input for receiving one or more fitting coefficients ($a_{ij}$), and a third input for receiving a correction order (n), and based thereupon, generating a plurality of corrected data values ($Y_j^c$) corresponding to the received non-corrected data values; wherein the corrected values are related to the non-corrected data values, the fitting coefficients, and the correction order by the following relationship:

$$Y_j^c = Y_j - \sum_{i=0}^{n} a_{ij} Y_j^i,$$

where (i=0, 1, . . . , n) and (j=1, 2, . . . , N); and a signal processing module interposed between the detector array and the non-uniformity correction module, said signal processing module including:

a pre-amplifier coupled to the detector array for receiving non-corrected data values and for performing pre-amplification on the received non-corrected data values and generating pre-amplified values;

a level shifter coupled to the pre-amplifier for performing level shifting on the pre-amplified values and generating level-shifted values; and an analog to digital converter coupled to the level shifter for converting the level-shifted values into a corresponding digital signal that is provided to the non-uniformity correction module as the non-corrected data values.

2. An imaging system comprising:

a detector array having a plurality (N) of detectors, arranged in rows and columns, each detector generating a non-corrected data value ($Y_j$); and a non-uniformity correction module, coupled to the detector array, for receiving the non-corrected data values for each detector and for correcting errors in the non-corrected data values, said non-uniformity correction module having a first input for receiving the non-corrected data values, a second input for receiving one or more fitting coefficients ($a_{ij}$), and a third input for receiving a correction order (n), and based thereupon, generating a plurality of corrected data values ($Y_j^c$) corresponding to the received non-corrected data values; wherein the corrected values are related to the non-corrected data values, the fitting coefficients, and the correction order by the following relationship:

$$Y_j^c = Y_j - \sum_{i=0}^{n} a_{ij} Y_j^i,$$

where (i=0, 1, ..., n) and (j=1, 2, ..., N);
wherein for a correction order of n, there are n+1 fitting coefficients for each detector where n is greater than or equal to zero; and
wherein the fitting coefficients are derived from pre-selected points on a temperature versus electrical signal curve.

3. The system of claim 2 wherein the correction order n is equal to 1 and there are 2 fitting coefficients for each detector.

4. The system of claim 2 wherein the correction order n is equal to 2 and there are 3 fitting coefficients for each detector.

5. The system of claim 2 wherein the correction order n is equal to 3 and there are 4 fitting coefficients for each detector.

6. The system of claim 2 wherein the correction order n is equal to 4 and there are 5 fitting coefficients for each detector.

7. The system of claim 2 wherein the correction order n is equal to 5 and there are 6 fitting coefficients for each detector.

8. An imaging system comprising:
a) a detector array having a plurality (N) of detectors, arranged in rows and columns, each detector generating a non-corrected data value ($Y_j$);
b) a non-uniformity correction module having a first input for receiving the non-corrected data values, a second input for receiving one or more correction parameters, and based thereupon, generating a plurality of corrected data values ($Y_j^c$) corresponding to the received non-corrected data values, said non-uniformity correction module including:
a first multiplier having a first input for receiving a first correction parameter and a second input for receiving the non-corrected data value, and based thereon, generating a first product of the first correction parameter and the non-corrected data value;
a second multiplier having a first input for receiving the non-corrected data value and a second input for receiving the non-corrected data value, and based thereon, generating a second product of the non-corrected data value and the non-corrected data value;
a third multiplier having a first input for receiving a second correction parameter and a second input coupled to the second multiplier for receiving the second product, and based thereon, generating a third product of the second correction parameter and the second product;
a first adder having a first input for receiving a third correction paramenter, a second input coupled to the first multiplier for receiving the first product, and based thereon for generating a first sum; and
a second adder having a first input coupled to the first adder for receiving the first sum, a second input coupled to the third multiplier for receiving the third product, and based thereon for generating a second sum which is the corrected data value.

9. The system of claim 8 further comprising:
a signal processing module, interposed between the detector array and the non-uniformity correction module, for receiving the non-corrected data values, for performing signal processing on the non-corrected data values, and for providing the processed non-corrected data values to the non-uniformity correction module.

10. The system of claim 9 wherein the signal processing module includes:
a pre-amplifier coupled to the detector array for receiving non-corrected data values and for performing pre-amplification on the received non-corrected data values and generating pre-amplified values;
a level shifter coupled to the pre-amplifier for performing level shifting on the pre-amplified values and generating level-shifted values; and
an analog to digital converter coupled to the level shifter for converting the level-shifted values into a corresponding digital signal.

11. The system of claim 8 wherein the detectors are infrared detectors.

12. The system of claim 8 wherein the correction parameters are derived from pre-selected points on a temperature versus electrical signal curve.

13. The system of claim 8 wherein the correction order n is equal to 2 and there are 3 correction parameters for each detector.

* * * * *